United States Patent
Beck

[15] 3,681,406
[45] Aug. 1, 1972

[54] N-ALKOXYALKYLIDENESULFONAMIDE COMPOUNDS

[72] Inventor: James R. Beck, Indianapolis, Ind.
[73] Assignee: Eli Lilly Company, Indianapolis, Ind.
[22] Filed: Nov. 3, 1970
[21] Appl. No.: 86,619

[52] U.S. Cl..................................260/397.7, 71/103
[51] Int. Cl..............................................C07c 143/78
[58] Field of Search....................................260/397.7

[56] References Cited

UNITED STATES PATENTS 3,325,541  6/1967  Aumuller et al..............260/556
3,367,949  2/1968  Soper.........................260/397.7

*Primary Examiner*—Henry R. Jiles
*Assistant Examiner*—G. Thomas Todd
*Attorney*—Everet F. Smith and Kathleen R. Schmoyer

[57] ABSTRACT

The present invention is directed to novel compounds of the formula

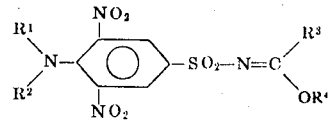

which compounds are useful as herbicides. In the above and succeeding formulas herein, $R^1$ represents hydrogen or $R^2$, and each $R^2$ independently represents loweralkyl of $C_1$–$C_4$, loweralkenyl of $C_3$–$C_4$, loweralkynyl of $C_3$–$C_4$, or radical of the formula —$CH_2$—$CH_2(CH_2)nY$, wherein n represents 0 or 1, and Y represents methoxy, cyano, bromo, or chloro, subject to the limitation that the groups represented by $R^1$ and $R^2$ together contain from 2 to 8, both inclusive, carbon atoms; $R^3$ represents hydrogen, loweralkyl of $C_1$–$C_{2a}$, or phenyl; and $R^4$ represents alkyl of $C_1$–$C_8$, alkyl, or 2-chloroethyl.

7 Claims, No Drawings

N-ALKOXYALKYLIDENESULFONAMIDE COMPOUNDS

DETAILED DESCRIPTION OF THE INVENTION

The present invention is directed to novel herbicidal compounds of the formula

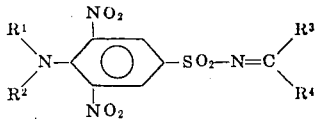

wherein $R^1$, $R^2$, $R^3$ and $R^4$ are as defined hereinabove. The compounds are prepared by the reaction of a 3,5-dinitro-$N^4$, $N^4$-$R^1$, $R^2$ sulfanilamide, of the formula

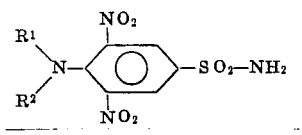

with an ortho ester of the formula

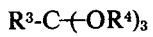

The reaction goes forward over a wide range of temperatures, but for good yields should be carried out at a temperature range of from 100° to 200° C. The reaction consumes the reactants in amounts representing equimolecular amounts, but an excess of the ortho ester serves additionally as reaction medium and assures higher yields; hence the use of excess ortho ester is preferred. The reaction yields the desired product of the present invention as well as by-product of the formula $R^4$—OH. Separation and, if desired, purification, are carried out in conventional procedures.

The compounds of the present invention are named herein as substituted sulfanilamides, with structure and position identfication as follows:

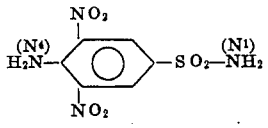

Aliphatic groups unless otherwise specified are straight-chain.

The synthesis of the compounds of the present invention is illustrated by the following examples.

EXAMPLE 1: $N^1$-(1-ETHOXYETHYLIDENE)-3,5-DINITRO-$N^4$, $N^4$-DIPROPYLSULFANILAMIDE 3,5-Dinitro-$N^4$, $N^4$-dipropylsulfanilamide (35.0 grams;

0.1 mole) and 75 milliliters of triethyl orthoacetate (about 0.4 mole) were mixed and the mixture heated to 100° C. and maintained at 100° C. for two and one-half hours. Nitrogen was blown in for the last one-half hour.

The reaction mixture was then cooled to room temperature, bout 150 milliliters of ether added, and the mixture filtered. The filtrate was concentrated on a steam bath, whereupon the desired $N^1$-(1-ethoxyethylidene)-3,5-dinitro-$N^4$, $N^4$-dipropylsulfanilamide product crystallized. The product so obtained melted at 73–4° C.

Analysis, Calc.: C, 46.15; H, 5,81; N 13.46.
Found: C, 46.37; H, 5.75; N, 13,68.

EXAMPLES 2–15;

In accordance with the foregoing teachings and with the procedures of Example 1, but employing appropriate other starting materials, the following other compounds of the present invention were prepared.

$N^1$-(1-butoxyethylidene)-3,5-dinitro-$N^4$,$N^4$-dipropylsulfanilamide, m.p., 41–4° C.

$N^1$-isobutoxymethylene-3,5-dinitro-$N^4$,$N^4$-dipropylsulfanilamide, m.p., 85–6° C.

$N^1$-(αethoxybenzylidene)- 3,5-dinitro-$N^4$,$N^4$-dipropylsulfanilamide, m.p., 106–7° C.

$N^1$-(1-methoxyethylidene)-3,5-dinitro-$N^4$,$N^4$-dipropylsulfanilamide, m.p., 96–7° C.

$N^1$-(1-ethoxypropylidene)-3,5-dinitro- $N^4$,$N^4$-dipropylsulfanilamide, m.p., 49°–50° C.

$N^1$-(2-chloroethoxymethylene)-3,5-dinitro-$N^4$,$N^4$-dipropylsulfanilamide, m.p., 105–6° C.

$N^1$-butoxymethylene-3,5-dinitro-$N^4$,$N^4$-dipropylsulfanilamide, m.p., 71–2° C.

$N^1$-propoxymethylene-3,5-dinitro-$N^4$,$N^4$-dipropylsulfanilamide, m.p., 94–5° C.

$N^1$-(α-methoxybenzylidene)-3,5-dinitro-$N^4$,$N^4$-dipropylsulfanilamide, m.p., 121–23° C.

$N^1$-(1-methoxypropylidene)-3,5-dinitro-$N^4$,$N^4$-dipropylsulfanilamide, m.p., 64–5° C.

$N^1$-allyloxymethylene-3,5-dinitro-$N^4$,$N^4$-dipropylsylfanilamide, m.p., 77–8° C.

$N^1$-(2-ethylhexyloxymethylene)-3,5-dinitro-$N^4$,$N^4$-dipropylsulfanilamide, an oil.

$N^1$-ethoxymethylene-3,5-dinitro-$N^4$,$N^4$-dipropylsulfanilamide, m.p., 114–15° C.

$N^1$-methoxymethylene-3,5-dinitro-$N^4$,$N^4$-dipropylsulfanilamide, m.p., 77–8° C.

EXAMPLES 16–25:

Yet other representative compounds illustrative of the present invention are the following:

$N^1$-methoxymethylene-3,5-dinitro-$N^4$,$N^4$-dimethylsulfanilamide $N^1$-ethoxymethylene-3,5-dinitro-$N^4$-ethyl-$N^4$-butylsulfanilamide $N^1$-(1-methoxypropylidene)-3,5-dinitro-$N^4$,$N^4$-diallysulfanilamide $N^1$-(1-ethoxyethylidene)-3,5-dinitro-$N^4$,$N^4$dipropynylsulfanilamide $N^1$-pentyloxymethylene-3,5-dinitro-$N^{,N4}$-bis-(2-methoxyethyl)sulfanilamide $N^1$-(1-methoxypropylidene)-3,5-dinitro-$N^4$,$N^4$-bis-(2-bromoethyl)sulfanilamide $N^1$-methoxymethylene-3,5-dinitro-$N^4$-isopropylsulfanilamide $N^1$-methoxymethylene-3,5-dinitro-$N^4$,$N^4$-bis(3-methoxypropyl)sulfanylamide $N^1$-methoxymethylene-3,5-dinitro-$N^4$,$N^4$-bis(3-chloropropyl)sulfanylamide sulfanilamide $N^1$-(1-methoxyethylidene)-3,5-dinitro-$N^4$,$N^4$-bis-(2-cyanoethyl)sulfanilamide The compounds of the present invention are adapted to be employed as herbicides. The compounds can be utilized to achieve broad herbicidal action; hence, in its broadest sense, the present invention is directed to a method which comprises applying to a plant part, which can be a stem, leaf, flower, fruit, root, or seed or other similar reproductive unit of a plant, a growth-inhibiting amount of one of the compounds of the present invention. However, the compounds can also be utilized to take advantage of selective patterns of herbicidal activity.

It is not critical to the practice of the present invention that complete destruction of undesirable vegetation be obtained, it being adequate if the growth of the unwanted vegetation is merely inhibited. Especially where selective action is sought, inhibition falling short of actual killing is adequate, particularly when combined with naturally occurring conditions such as limited moisture and the like which more adversely affect the vegetation selectively inhibited than the crop plant.

The compounds of the present invention are suited to a wide variety of herbicidal applications. Thus, for example, at rates which evoke the selective action of the compounds, which rates are defined more completely hereinbelow, the compounds can be used as selective herbicides in crop plants, such as, for example, cotton, corn, sorghum, soybeans, and the like. In such use, application can be made preemergent to both crops and weeds, or, preferably by means of a directed spray application technique, postemergent to the crop plant but both preemergent and post emergent to the weeds. In another application, the compounds can be used to give broad herbicidal action on non-crop land, including intermittently non-crop strips of contour-farmed land. For such usage on so-called fallow land, application can be made in spring to suppress vegetative growth until a fall or following spring planting, or in the fall to suppress vegetative growth until a spring or following fall planting. Furthermore, in another application, the present compounds can be utilized to control weeds in tree crop plantings, such as plantings of the various citrus trees. Also, the compounds can be used for turf applications. In all of these various applications, and yet others for which the present compounds are suited, another advantage is that the compounds need not be disced into the soil being treated, it being adequate if one of the compounds, or a formulation containing one of the compounds, is merely spread onto the top surface. However, where desired or convenient, the compounds can be disced into, or otherwise mechanically mixed with the soil. In addition to the foregoing terrestrial embodiments, the present compounds can also be utilized as aquatic herbicides.

The practice of the present invention in any of its numerous embodiments can in some instances be carried out with unmodified compound; however, for good results, it is generally necessary that the compound be employed in modified form, that is, as one component of a composition formulated to implement the plant growth-inhibiting effects. Thus, for example, the active agent can be mixed with water or other liquid or liquids, preferably aided by the usage of a surface active agent. The active agent can also be incorporated on a finely divided solid, which can be a surface active substance, to yield a wettable powder, which can subsequently be dispersed in water or other liquid, or incorporated as part of a dust which can be applied directly. Other methods of formulations are known in the art and can be employed in implementing the present invention.

In carrying out the novel method of the present invention, the exact amount of the active agent employed is not critical and will vary, depending upon the type of growth-inhibiting effect desired, the identity of the plants concerned, the particular active agent used, weather conditions, and the like. In general, a broad growth-inhibiting effect is obtained with rates of from about 8 to 20 pounds or more of active agent per acre, and such rates are suitable and effective for control of vegetative growth on fallow land. When it is desired to obtain a selective growth-inhibiting effect on weeds in areas containing crop plants, such as corn, soybeans, and cotton, rates of from 0.125 to 8.0 pounds generally give good results. When in typical mode of operation, the active agent is employed as a composition comprising the agent, the exact concentration of active agent in the composition is not critical, except that the concentration and total amount of formulation employed be adequate to supply the appropriate amount of active agent on a per acre basis. In general, good results are obtained when employing formulations containing the active agent in a concentration of from 0.5 to 10 percent or higher, in the instance of a liquid formulation; and in a concentration of from 1.0 to 5.0 percent or higher, in the instance of a dust, powder, granule, or the like. More concentrated formulations can be prepared and are often preferred in that they can serve, depending upon the particular application contemplated and the particular concentration, both as a concentrated formulation for purposes of shipment, storage, and the like, and as an ultimate treating composition. Thus, for example, formulations often preferably contain a surface active agent and the present active agent, the latter being present in an mount of from 0.5 to 99.5 percent, by weight; or an inert, finely divided solid and the present active agent, the latter being present in an amount of from 1.0 to 99.0 percent, by weight. Such formulations, as indicated, can be employed directly in certain applications, but can also be diluted and subsequently employed in many other applications.

Liquid compositions containing the desired amount of active agent are prepared by dissolving the substance in a liquid, with or without the aid of a surface active dispersing agent such as an ionic or non-ionic emulsifying agent. Suitable liquids include agricultural spray oils and the petroleum distillates such as xylene, diesel fuel, kerosene, fuel oil naphthas and Stoddard solvent. The choice of dispersing and emulsifying agent and the amount thereof employed is dictated by the nature of the composition any by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyalkylene derivatives or sorbitan esters, complex ether alcohols, and the like. Representative surface active agents which are suitably employed in implementing the present invention are identified in U.S. Pat. No. 3,095,299, second column, lines 25–36, N0. 2,655,447, column 5, and No. 2,412,510, columns 4 and 5.

In the preparation of dust compositions, the active ingredient is intimately dispersed in and on a finely divided solid such as clay, talc, chalk, gypsum, limestone, vermiculite fines, perlite, and the like. In one method of achieving such dispersion, the finely divided carrier is mechanically mixed or ground with the active agent.

Similarly, dust compositions containing the toxicant compounds can be prepared with various of the solid surface active dispersing agents such as bentonite, fuller's earth, attapulgite and other clays. Depending upon the proportions of ingredients, these dust compositions can be employed as concentrates and subsequently diluted with additional solid surface active dispersing agents or with chalk, talc, or gypsum and the like to obtain the desired amount of active ingredient in a composition adapted to be employed for the suppression of the growth of the plants. Also, such dust compositions can be dispersed in water, with or without the aid of a dispersing agent, to form spray mixtures.

Formulations containing the present active agent are often advantageously further modified by incorporation therein of an effective amount of a surfactant which facilitates the dispersion and spreading of the formulation of the plant leaf surfaces and the incorporation of the formulation by the plant.

In accordance with the present invention, the active agent can be dispersed is soil or other growth media in any convenient fashion. Applications can be carried out by simply mixing with the media, by applying to the surface of soil and thereafter dragging or discing into the soil to the desired depth, or by employing a liquid carrier to accomplish the penetration and impregnation. The application of spray and dust compositions to the surface of soil, or to plant parts or the above ground surfaces of plants can be carried out by conventional methods, e.g., powder dusters, boom and hand sprayers and spray dusters, whether surface or air-borne. However, while such conventional modes of application can be used, they are not required. As above noted, it is an advantage of the present invention that the compounds serving as active agent are active and effective as herbicides when merely placed on the surface of the soil, without any additional step to assist incorporation. Thus, the compounds are of substantially the same efficacy regardless of whether they are applied to the surface only, or whether they are applied to the surface and subsequently disced into the soil.

In a further method, the distribution of the active agent in soil can be accomplished by introducing the agent into the water employed to irrigate the soil. In such procedures, the amount of water is varied with the porosity and water-holding capacity of the soil to obtain a desired depth of distribution of the agent.

In addition, the present method also comprehends the employment of an aerosol composition containing one or more of the present active agents as an active compound. Such a composition is prepared according to conventional methods wherein the agent is dispersed in a solvent, and the resultant dispersion mixed with a propellant in liquid state. Such variables as the particular agent to be used and the nature of the vegatation which is to be treated will determine the desirability of the solvent and concentration of the agent therein.

EXAMPLE 26:

The formulation of the compounds of the present invention for the purpose of conducting the herbicidal evaluation, the results of which are reported hereinbelow, was carried out in accordance with conventional procedures. The compound to be evaluated was initially suspended in a 1:1 acetone/ethanol solution of a blend of nonionic sulfonate emulsifying agents. The suspension was then diluted with an aqueous solution of the same blend of agents to obtain the ultimate treating composition; this composition contained 4.15 percent of each of the acetone and ethanol, 1,000 ppm. of the blend of emulsifying agents, and the respective compounds in an amount to supply the desired pounds per acre. In the instance of some of the lower rates, a formulation so obtained was further diluted with water containing 1,000 ppm. of the blend of emulsifying agents, only, thus further lessening the concentration of the ethanol and acetone.

EXAMPLES 27–41:

Various of the compound of the present invention were evaluated for preemergent application to various species of plants. In this evaluation, a soil was prepared consisting of one part masonry sand and one part shredded top soil blended together in a cement mixer. One gallon of this soil was placed in a 21.5 × 31.5 cm. galvanized flat and was patted down with a bench brush until level. A three-row marker was used to make 2 ½ cm. deep furrows in approximately two-fifths of the flat. Crop seeds consisting of four kernels of corn, five cotton seeds and five soybean seeds were placed in these furrows. A four-row template was then placed on the remaining soil and the indicated approximate numbers of each of the following seeds were planted, one species to each section: foxtail (millet), 80–100 seeds; velvetleaf (40–50 seeds); rough pigweed (150–250 seeds); and large crabgrass (100–150 seeds).

Sufficient soil was added to cover the entire flat. Thus, the weed seeds were covered to a depth of about 6 mm. and the crop seeds were covered to a depth of about 3 cm.

In assaying the effect of a compound as a preemergent herbicide, a flat prepared as above, taken either on the day of planting or on the next day, was placed in a chamber equipped with a turntable and an air exhaust. A herbicidal composition containing the compound prepared as described in the preceding example was applied to the flat with a modified DeVilbiss atomizer hooked to an air source. Twelve and one-half milliliters of the composition under test were applied to each flat either n the day of planting or on the succeeding day. Injury ratings and observations as to type of injury were made eleven to twelve days after treatment. The injury rating scale used was as follows:

0--no injury
1--slight injury
2--moderate injury
3--severe injury
4--death When more than one determination was carried out at a given rate, an average value was calculated for the injury rating.

In the following table setting forth the results of the evaluation, column 1 gives the name of the compounds under test; column 2, the rate in pounds per acre at which the compound was applied to the test flat; and the remaining columns, the injury to the particular plant seeds or seedlings as measured by the foregoing scale.

TABLE 1.—INJURY RATING ON PREEMERGENT TREATMENT

| Compound | Lbs./acre | Corn | Cotton | Soybean | Crabgrass | Pigweed | Foxtail | Velvet-leaf |
|---|---|---|---|---|---|---|---|---|
| $N^1$-(1-butoxyethylidene)-3,5,-dinitro-$N^4$,$N^4$-dipropylsulfanilamide | 8 | 2 | 1 | 1 | 4 |   | 3 |   |
|  | 4 | 1 | 0 | 0 | 4 | 4 | 3 |   |
|  | 2 | 1 | 0 | 0 | 4 | 2.5 | 3 |   |
|  | 1 | 0.5 | 0 | 0 | 3.5 | 2 | 2 |   |
| $N^1$-isobutoxymethylene-3,5-dinitro-$N^4$,$N^4$-dipropylsulfanilamide | 8 | 2 | 2 | 2 | 4 | 4 | 3 |   |
|  | 4 | 1 | 0 | 1 | 4 | 3 | 3 |   |
| $N^1$-($\alpha$-ethoxybenzylidene)-3,5-dinitro-$N^4$,$N^4$-dipropylsulfanilamide | 8 | 1 | 1 | 1 | 3 | 4 | 2 |   |
|  | 4 | 1 | 0 | 0 | 4 |   | 3 |   |
|  | 2 | 0.5 | 0 | 0 | 4 | 3 | 3 |   |
| $N^1$-(1-methoxyethylidene)-3,5,-dinitro-$N^4$,$N^4$-dipropylsulfanilamide | 8 | 1 | 1 | 1 | 4 | 4 | 3 | 2 |
|  | 4 | 0 | 2 | 1 | 4 | 4 | 3 | 3 |
|  | 2 | 0 | 0.5 | 1 | 3.5 | 4 | 2.5 | 2 |
| $N^1$-(1-ethoxypropylidene)-3,5-dinitro-$N^4$,$N^4$-dipropylsulfanilamide | 8 | 2 | 2 | 2 | 4 | 4 | 3 | 3 |
|  | 4 | 0 | 0 | 0 | 3 | 4 | 3 | 2 |
|  | 2 | 0 | 0.5 | 1 | 3.5 | 4 | 3 | 2 |
|  | 1 | 0 | 0.5 | 0.5 | 3.5 | 3 | 3 | 1 |
| $N^1$-(2-chloroethoxy-methylene)-3,5-dinitro-$N^4$,$N^4$-dipropylsulfanilamide | 8 | 0 | 1 | 1 | 4 | 4 | 3 | 2 |
|  | 4 | 0 | 0 | 1 | 4 | 4 | 3 |   |
|  | 2 | 1.5 | 0 | 1.5 | 4 | 4 | 3 | 2 |
|  | 1 | 0.5 | 0 | 0.5 | 3 | 4 | 3 | 2 |
| $N^1$-butoxymethylene-3,5-dinitro-$N^4$,$N^4$-dipropylsulfanilamide | 8 | 1 | 2 | 2 | 4 | 4 | 4 | 3 |
|  | 4 | 0 | 0 | 1 | 4 | 4 | 3 | 2 |
|  | 2 | 0.5 | 3 | 1 | 4 | 4 | 2.5 | 0 |
| $N^1$-propoxymethylene-3,5-dinitro-$N^4$,$N^4$-dipropylsulfanilamide | 8 | 2 | 0 | 2 | 4 | 4 | 3 | 2 |
|  | 4 | 1 | 0 | 1 | 4 | 4 | 3 |   |
|  | 2 | 0 | 0 | 0.5 | 3.5 | 3.5 | 2.5 |   |
| $N^1$-($\alpha$-methoxybenzylidene)-3,5-dinitro-$N^4$,$N^4$-dipropylsulfanilamide | 8 | 1 | 0 | 1 | 4 | 4 | 3 | 2 |
|  | 4 | 0 | 0 | 0 | 3 | 3 | 3 |   |
|  | 2 | 0 | 0 | 0 | 3.5 | 2.5 | 1.5 |   |
| $N^1$-(1-methoxypropylidene-3,5-dinitro-$N^4$,$N^4$-dipropylsulfanilamide | 8 | 1 | 1 | 1 | 4 | 4 | 3 | 2 |
|  | 4 | 1 | 0 | 0 | 3 | 4 | 3 |   |
|  | 2 | 0 | 0 | 0.5 | 3.5 | 3 | 3 |   |
| $N^1$-allyloxymethylene-3,5-dinitro-$N^4$,$N^4$-dipropylsulfanilamide | 8 | 2 | 1 | 2 | 4 | 4 | 3 | 2 |
|  | 4 | 1 | 0 | 1 | 4 | 4 | 3 |   |
|  | 2 | 0 | 0 | 0 | 4 | 3 | 3 |   |
| $N^1$-(2-ethylhexyloxymethylene)-3,5-dinitro-$N^4$,$N^4$-dipropylsulfanilamide | 8 | 1 | 1 | 0 | 4 | 4 | 3 |   |
|  | 4 | 1 | 0 | 1 | 4 | 4 | 3 |   |
|  | 2 | 1 | 0 | 0.5 | 3.5 | 4 | 3 |   |
|  | 1 | 0 | 1 | 0.5 | 3.5 | 2 | 3 |   |
| $N^1$-ethoxymethylene-3,5-dinitro-$N^4$,$N^4$-dipropylsulfanilamide | 8 | 2 | 1 | 2 | 4 | 4 | 4 | 3 |
|  | 4 | 1 | 1 | 2 | 4 | 4 | 3 | 3 |
|  | 2 | 0.5 | 0.5 | 2 | 3.5 | 4 | 3 | 2 |
|  | 1 | 0.3 | 0 | 0.6 | 4 | 4 | 3 | 2 |
| $N^1$-(1-ethoxyethylidene)-3,5-dinitro-$N^4$,$N^4$-dipropylsulfanilamide | 8 | 1 | 1 | 1 | 3 | 4 | 3 | 3 |
|  | 4 | 2 | 2 | 2 | 3 | 3 | 3 | 2 |
|  | 2 | 0.5 | 0 | 0.5 | 3 | 3.5 | 3 | 2.5 |
| $N^1$-methoxymethylene-3,5-dinitro-$N^4$,$N^4$-dipropylsulfanilamide | 8 | 2 | 3 | 2 | 4 | 3 | 4 | 3 |
|  | 4 | 0 | 0 | 0 | 4 | 4 | 3 | 2 |
|  | 2 | 0 | 2 | 1 | 3.5 | 3.5 | 3 | 2 |

EXAMPLES 41–51:

Essentially the same results as those reported in foregoing Examples 27–41 are obtained when evaluating the following other representative compounds of the present invention.

$N^1$-methoxymethylene-3,5-dinitro-$N^4$,$N^4$-dimethylsulfanilamide $N^1$-ethoxymethylene-3,5-dinitro-$N^4$-ethyl-$N^4$-butylsulfanilamide $N^1$-(1-methoxypropylidene)-3,5-dinitro-$N^4$,$N^4$-diallylsulfanilamide $N^1$-(1-ethoxyethylidene)-3,5-dinitro-$N^4$,$N^4$-dipropynylsulfanilamide $N^1$-pentyloxymethylene-3,5-dinitro-$N^4$,$N^4$-bis-(2-methoxyethyl)sulfanilamide $N^1$-(1-methoxypropylidiene)-3,5-dinitro-$N^4$,$N^4$-bis-(2-bromoethyl)sulfanilamide $N^1$-methoxymethylene-3,5-dinitro-$N^4$-isopropylsulfanilamide $N^1$-methoxymethylene-3,5-dinitro-$N^4$,$N^4$-bis(3-methoxypropyl)sulfanilamide $N^1$-methoxymethylene-3,5-dinitro-$N^4$,$N^4$-bis(3-chloropropyl)sulfanilamdie $N^1$-(1-methoxyethylidene)-3,5-dinitro-$N^4$,$N^4$-bis-(2-(Yanoethyl)sulfanilamide Satisfactory results are obtained when the active agent of the present invention, or a composition comprising such active agent, is combined with other agricultural materials intended to be applied to plants, plant parts, or their habitats. Such materials include fertilizers, fungicides, nematocides, insecticides, other herbicides, soil conditioning agents, and the like.

The ortho esters to be employed as starting materials in accordance with the present invention:

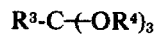

are in many instances commercially available. However, all of the compounds can be synthesized in accordance with known procedures: see, e.g., Wagner and Zook, Synthetic Organic Chemistry (John Wiley & Sons, New York, 1965), chapter 16 and references there cited. The 3,5-dinitro-$N^4$,$N^4$-$R^1$,$R^2$-sulfanilamide compounds to be employed in the preparation of the compounds of the present invention:

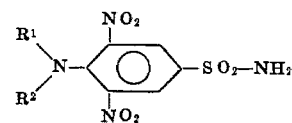

are in many instances known compounds--see U.S. Pat. No. 3,367,949. Those compounds not expressly covered by the scope of this patent are prepared in like manner, by reaction of an appropriately substituted 4-amino-3,5-dinitrobenzenesulfonyl halide with ammonium hydroxide.

I claim:

1. The compound of the formula

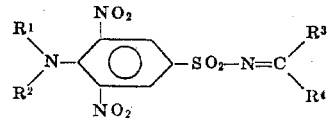

wherein $R^1$ represents hydrogen or $R^2$, and each $R^2$ independently represents loweralkyl of $C_1$–$C_4$, loweralkenyl of $C_3$–$C_4$, lower-alkynyl of $C_3$–$C_4$, or radical of the formula —$CH_2$—$CH_2$n—($CH_2$)— wherein $n$ represents 0 or 1, and Y represents methoxy, cyano, bromo, or chloro, subject to the limitation that the groups represented by $R^1$ and $R^2$ together contain from 2 to 8, both inclusive, carbon atoms; $R^3$ represents hydrogen, lower alkyl of $C_1$—$C_2$, or phenyl; and $R^4$ represents alkyl of $C_1$—$C_8$, alkyl, or 2-chloroethyl.

2. The compound of claim 1 wherein both $R^1$ and $R^2$ represent propyl.

3. The compound of claim 2 which is $N^1$-(1-methoxyethylidene)-3,5-dinitro-$N^4$,$N^4$-dipropylsulfanilamide.

4. The compound of claim 2 which is $N^1$-ethoxymethylene-3,5-dinitro-$N^4$,$N^4$-dipropylsulfanilamide.

5. The compound of claim 2 which is $N^1$-(1-ethoxyethyl-idene)-3,5-dinitro-$N^4$,$N^4$-dipropylsulfanilamide.

6. The compound of claim 2 which is $N^1$-(1-methoxypropylidene)-3,5-dinitro-$N^4$,$N^4$-dipropylsulfanilamide.

7. The compound f claim 2 which is $N^1$-methoxymethylene-3,5-dinitro-$N^4$,$N^4$-dipropylsulfanilamide.

* * * * *